Nov. 22, 1938.    G. L. COTTER    2,137,227
RAILWAY TRAIN BRAKE EQUIPMENT
Filed Nov. 14, 1934
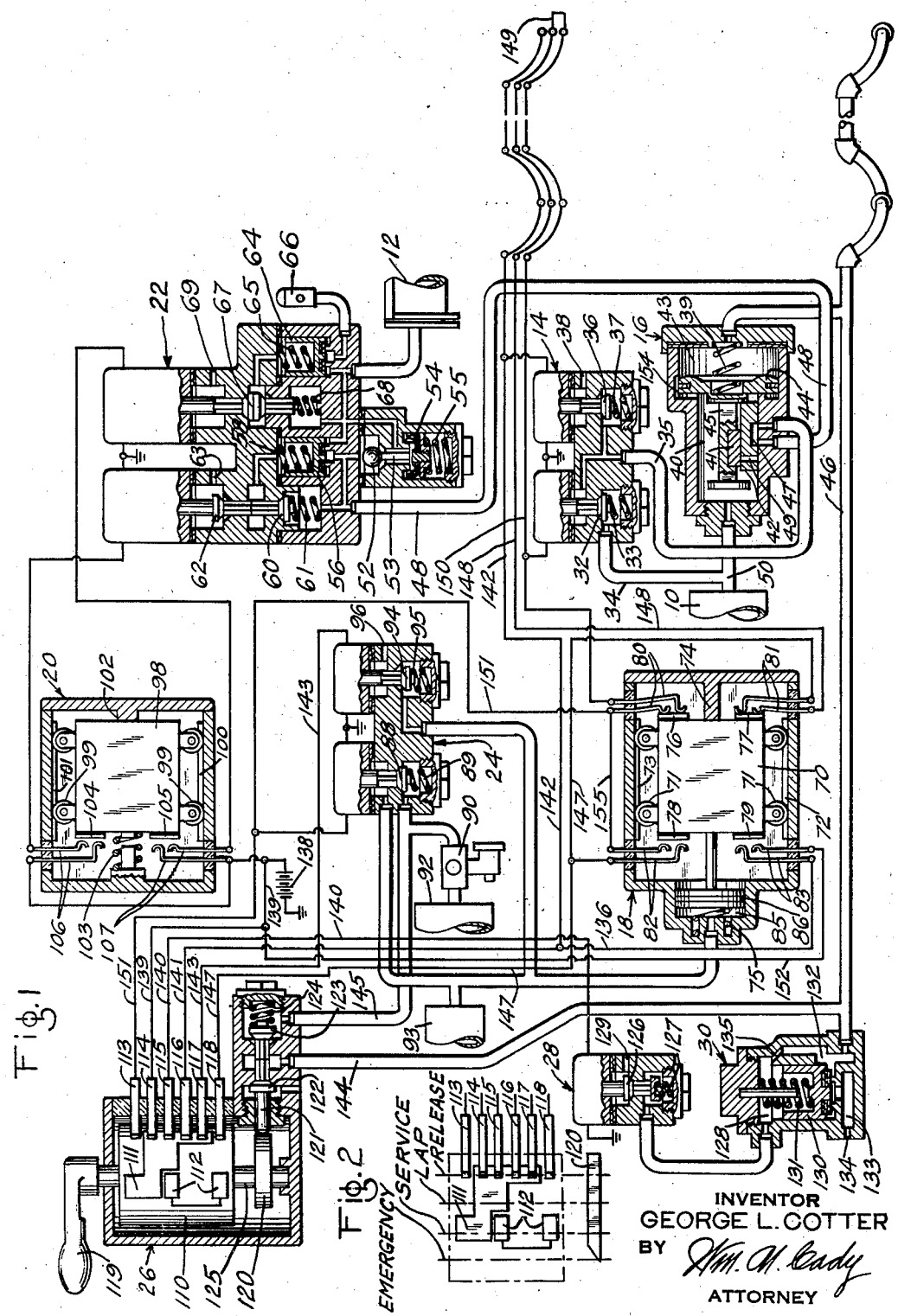
INVENTOR
GEORGE L. COTTER
BY
*Wm. M. Cady*
ATTORNEY Patented Nov. 22, 1938

2,137,227

UNITED STATES PATENT OFFICE 2,137,227

RAILWAY TRAIN BRAKE EQUIPMENT

George L. Cotter, Wilkinsburg, Pa., assignor to The Westinghouse Air Brake Company, Wilmerding, Pa., a corporation of Pennsylvania Application November 14, 1934, Serial No. 752,959

31 Claims. (Cl. 303—24)

This invention relates to railway train brake equipments, and more particularly to brake equipments for trains intended for high speed service.

Where trains are intended for use in high speed service, safety considerations demand that a brake equipment be employed which provides for the highest practical degree of reliability. If a fluid pressure brake system is employed, a high degree of reliability can be obtained by providing means for effecting applications of the brakes both by straight air operation and by automatic operation. Both of these methods of operation are well known in the art and have been in use independently, and in some instances combined, for many years.

When a train is traveling at high speed, high braking forces must be applied to bring the train to a stop in a relatively short distance. When such braking forces are applied, there is always considerable danger of causing sliding of the wheels as the speed of the train diminishes, due to the coefficient of friction between the rubbing parts of the brakes increasing as the speed diminishes. To prevent sliding of the wheels the operator must periodically diminish the braking force as his judgment dictates, or some form of automatic means must be employed to automatically reduce the braking force as the speed of the train diminishes. Retardation controller devices have heretofore been proposed for this purpose, such devices operating to maintain the maximum rate of retardation permitted by track conditions.

Where a brake equipment provides for applications of the brakes by both straight air and automatic operation, it is highly desirable that one or more retardation controller devices be provided for controlling applications by either mode of operation, so as to definitely minimize the danger of sliding of the wheels.

It is a principal object of the present invention to provide a combined straight air and automatic brake equipment in which means are provided for controlling the rate of retardation due to an application of the brakes, whether effected by straight air operation or by automatic operation.

Another object of this invention is to provide a combined brake equipment of the character above referred to, in which service applications are normally effected by straight air operation and emergency applications by automatic operation, and in which one retardation controller device is provided for controlling the rate of retardation produced by straight air operation and another retardation controller device is provided for controlling the rate of retardation produced by automatic operation.

A still further object of the invention is to provide a retardation controller device for controlling applications of the brakes effected by straight air operation in which the operator may vary the setting of the retardation controller device at will in order to limit the rate of retardation produced by an application of the brakes to any desired value.

A yet further object of the invention is to provide an interlock arrangement between the means for effecting straight air operation and the means for effecting automatic operation, so that upon failure of the straight air means in initiating an application of the brakes, the automatic means will immediately respond to effect an automatic application of the brakes.

Still further objects and advantages of the invention will be apparent from the following description, which is taken in connection with the attached drawing, wherein, Figure 1 is a schematic and partly diagrammatic view of one form that the invention may take, as applied to the head end car of a train.

Figure 2 is a developed diagrammatic view of the brake valve and controller device shown to the upper left in Figure 1.

For the sake of clarity in description, the embodiment pictured has been illustrated in connection with one car only of a train, but it will be appreciated from the following description that the adaptation to a train comprising a number of cars involves merely a duplication of portions of the apparatus shown for the one car. It is to be understood therefore that the invention is intended for either a single vehicle or for a train comprising a number of cars, whether of the articulated or non-articulated type.

Referring now to the drawing, I have shown a combined straight air and automatic brake system, in which the supply of fluid under pressure from a supply reservoir 10 to a brake cylinder 12 may be controlled during straight air operation by an application and release magnet valve device 14, and during automatic operation by an emergency valve device 16.

For controlling the application and release magnet valve device 14 so as to control the rate of retardation produced by a straight air application of the brakes, I have provided a retardation controlled device 18. For similarly controlling applications of the brakes effected by automatic operation, I have provided a second retardation controller device 20 and a cut-off and release magnet valve device 22.

The retardation controller device 20 is intended to limit the rate of retardation during automatic operation to a single maximum rate, while the retardation controller device 18 provides for the selection of different rates of retardation during straight air operation. To provide for adjusting this latter retardation controller device in accordance with a desired rate of retardation, I have provided an adjusting magnet valve device 24.

For manually controlling both straight air and automatic applications of the brakes, as well as for controlling the setting of the retardation controller device 18, I provide a brake valve and controller device 26.

In order to effect an automatic application of the brakes upon failure of the straight air portion of the equipment to respond to operation of the brake valve and controller device 26 to service position, I provide an interlock magnet valve device 28 and an application valve device 30.

Considering now more in detail these devices, the application and release magnet valve device 14 comprises an application valve 32 urged toward a seated position by a spring 33, and toward an unseated position by action of an electromagnet in the upper part of the casing, which when energized actuates the valve downwardly. When the valve 32 is unseated, fluid under pressure may flow from the supply reservoir 10, through pipe 34, past the unseated valve 32, to pipe 35, from whence it flows to the brake cylinder 12 as will appear more fully presently.

The application and release magnet valve device 14 is also provided with a release valve 36, which is also urged toward seated position by a spring 37, and toward unseated position by another electromagnet in the upper part of the casing, which when energized actuates the valve downwardly. When the valve 36 is in unseated position, a communication is established between the pipe 35 and the atmosphere, past the unseated valve and through a port 38.

The emergency valve device 16 comprises a casing having a slide valve chamber 40, in which are disposed a graduating valve 41 and a main slide valve 42, and a piston chamber 43, in which is disposed a piston 44. The piston 44 has a stem 45 recessed to receive the graduating valve 41 and provided with collars adapted to engage the main slide valve 42 with a lost motion movement when the piston 44 moves.

The piston chamber 43 is connected to a brake pipe 46, which extends throughout the train, and when the brake pipe is maintained charged with fluid under pressure, the piston 44 remains in a left hand or release position, as shown in the drawing. In release position of the piston 44, a cavity 47 in the slide valve 42 connects the aforementioned pipe 35 with another pipe 48, and when the pressure in the brake pipe 46, and the piston chamber 43, is reduced at an emergency rate, the piston 44 moves to its extreme right hand position, compressing spring 39, where the slide valve 42 blanks the passage connecting with the pipe 35, and a port 49 therein registers with the passage connecting with the pipe 48. The graduating valve 41 will at this time have uncovered the port 49 so that slide valve chamber 40 is in communication with the pipe 48. The slide valve chamber 40 is in constant communication with the supply reservoir 10 by way of pipe 50, so that for this position of the two slide valves, fluid under pressure will be supplied from the supply reservoir to the pipe 48.

The pipe 48 leads to the brake cylinder 12 by way of the cut-off and release magnet valve device 22. This valve device is provided with a ball valve 52 past which fluid under pressure may flow to the brake cylinder 12. The ball valve 52 is urged toward an unseated position by a stem 53 of a piston 54, which is urged upwardly by a spring 55. The pressure of the fluid flowing past the ball valve 52 when unseated acts upon the upper side of the piston 54, and when the pressure of fluid acting on the upper face of the piston exceeds a predetermined degree, the piston will be actuated downwardly far enough to permit the ball valve 52 to be seated. The purpose of this arrangement will appear more fully hereinafter.

The ball valve 52 controls one communication between pipe 48 and brake cylinder 12, and in parallel with this communication is a second communication controlled by a cut-off valve 56. The cut-off valve 56 is urged toward a seated position by a spring 58, and is urged toward an unseated position by the pressure of fluid therebelow.

The valve 56 may however be held seated by maintaining a pressure in the valve chamber above the valve. For this purpose there is provided a supply valve 60 urged toward a seated position by a spring 61, and a release valve 62 urged toward an unseated position by the same spring. The two valves are urged toward unseated and seated positions, respectively, by an electromagnet in the upper part of the casing, which when energized actuates the two valves downwardly. When the supply valve is seated and the release valve unseated, the valve chamber is in communication with the atmosphere by way of a port 63. When the release valve is seated and the supply valve unseated, the valve chamber is in communication with the pipe 48, and fluid under pressure may thus be supplied to the valve chamber to hold the cut-off valve 56 seated.

In another part of the cut-off and release magnet valve device casing there is provided a release valve 64 urged toward a seated position by a spring 65. This release valve controls a communication between the brake cylinder 12 and a safety valve device 66, which, as well known in the art, is designed to release fluid under pressure from the volume to which it is connected until the pressure in the volume has been reduced to a predetermined value. When the release valve 64 is unseated, brake cylinder pressure may then be reduced down to the setting of the safety valve device.

As described in connection with the cut-off valve 56, the release valve 64 may be held seated by the supply of fluid under pressure to the chamber thereabove. For controlling this pressure there is provided a double beat valve 67, which is urged toward an upper seated position by a spring 68 and toward a lower seated position by action of another electromagnet in the upper part of the casing, which when energized actuates the double beat valve downwardly. When the double beat valve is in upper seated position, a communication is established between the brake cylinder 12 and the release valve chamber, and when the double beat valve is in lower seated position this communication is cut off and the release valve chamber is connected to the atmosphere by way of a port 69.

The retardation controller device 18 is embodied in a casing provided with a movable body 70 having wheels 71 adapted to roll in a lower trackway 72 and an upper trackway 73. The body 70 is urged to the right to a biased position, against a stop 74, by a spring 75.

The body 70 carries four contacts 76, 77, 78 and 79, insulated therefrom. In the biased position of the body 70, contact 76 engages and connects together stationary contacts 80 and contact 77 similarly connects together stationary contacts 81.

The retardation controller device 18 is positioned on the head end car in a manner such that when the train is decelerating, the body 70 moves to the left according to the rate of retardation. When the body 70 moves far enough to the left, contact 78 engages and connects together another set of stationary contacts 82 slightly before or at the same time as stationary contacts 80 and 81 are opened. Upon further movement, contact 79 engages and connects together still another set of stationary contacts 83, slightly after stationary contacts 80 are opened.

Movement of the body 70 to the left is opposed by the force of the spring 75 and may also be opposed by the pressure of fluid in a chamber 85, which has a piston 86 disposed therein, the piston being secured to the body 70. While the spring 75 exerts a constant force in opposition to movement of the body, the pressure of fluid in the chamber 85 may be varied through operation of the adjusting magnet valve device 24.

This valve device comprises a supply valve 88 urged toward a seated position by a spring 89 and toward an unseated position by an electromagnet in the upper part of the casing which when energized actuates the valve downwardly. When the supply valve 88 is unseated, fluid under pressure is supplied from a feed valve device 90, which regulates the pressure of fluid supplied from a main reservoir 92, to the chamber 85, and a volume reservoir 93, the volume reservoir being provided to increase the volume so as to provide for finer gradations of the pressure in the chamber 85, and to cause the degree of pressure in chamber 85 to substantially correspond to the initial degree of brake cylinder pressure.

The magnet valve device 24 is also provided with a release valve 94, which is urged toward seated position by a spring 95 and toward unseated position by another electromagnet in the upper part of the casing, which when energized actuates the valve downwardly. When the valve 94 is unseated, a communication is established between the chamber 85, and the volume reservoir 93, and the atmosphere, by way of port 96.

The retardation controller device 20 is embodied in a casing having a body 98 provided with wheels 99 adapted to roll in a lower trackway 100 and an upper trackway 101. The body 98 is urged to the right against a stop 102 by a spring 103. Like the other, this retardation controller device is also positioned on the head end car so that when the vehicle is decelerating the body 98 moves to the left according to the rate of retardation. Body 98 is provided with two contacts 104 and 105, suitably insulated therefrom, and when the body moves far enough to the left, the contact 104 engages and connects together stationary contacts 106 slightly before contact 105 engages and connects together similar contacts 107.

The brake valve and controller device 26 is provided with a drum 110, which has secured thereto and insulated therefrom a contact segment 111 and two contact segments 112. The contact segment 111 is adapted to engage contact fingers 113 to 117, inclusive, while the two contacts segments 112 are adapted to engage and connect together contact fingers 115 and 118.

The drum 110 is carried by an operating shaft 125, which is adapted to be rotated by a handle 119. Rigidly disposed on the shaft 125 is a cam 120 which engages a stem 121 for operating a release valve 122 and a supply valve 123.

The release valve 122 is urged toward an unseated position and the supply valve 123 toward a seated position by a spring 124, but are normally held in seated and unseated positions, respectively, by engagement of the stem 121 with the high part of the cam 120, except when the cam 120 is rotated to an extreme or emergency position, as will hereinafter more fully appear.

The interlock magnet valve device 28 is provided with a valve 126 urged toward an unseated position by spring 127 and toward a seated position by an electromagnet in the upper part of the casing, which when energized actuates the valve downwardly. When the valve 126 is in unseated position, a communication is established between a valve chamber 128 in the aforementioned valve device 30 and the atmosphere, by way of port 129. When the valve 126 is in seated position, this communication is cut off.

Disposed in the valve chamber 128, of the application valve device 30, is a valve 130, urged toward a seated position by a spring 131. The valve 130 controls communication between a brake pipe chamber 132, connected to the brake pipe 46, and a chamber 133 in communication with the atmosphere by way of port 134.

The brake pipe chamber 132 and valve chamber 128 are in restricted communication by way of a restricted passage 135, and when the pressures in these two chambers are substantially equal, the valve 130 is held in seated position. When however, the pressure in the chamber 128 is reduced, as when the valve 126, of the interlock magnet valve device, is unseated, the pressure acting on the outer seated area of the valve 130 from the chamber 132 unseats the valve, and the brake pipe 46 is thus vented to the atmosphere.

The operation of this embodiment of my invention is as follows:

*Running condition*

When the train is running, the handle 119 of the brake valve and controller device 26 is maintained in release position, in which position the drum 110 and cam 120 will have the positions diagrammatically indicated in the developed view of Figure 2. As will be noted from this figure, the contact segment 111 engages contact fingers 114, 115, 116 and 117. Contact finger 114 is connected to one terminal of a battery 138 by way of conductor 139, and contact finger 115 is connected to one terminal of the electromagnet in the interlock magnet valve device 28, by way of conductor 140. Since, as indicated, one terminal of the battery 138 is grounded and one terminal of the electromagnet in the magnet valve device 28 is grounded, the electromagnet will be energized and the valve 126 will be held in seated position. The valve 130 in the application valve device 30, will then be held also in seated position.

Contact finger 116 is connected by conductors 141 and 142 to the release valve electromagnet in the application and release magnet valve device 14, and contact finger 117 is connected by conductor 143 to the release electromagnet in the adjusting magnet valve device 24. These two electromagnets will therefore be energized, and release valves 36 and 94 will be held in unseated position. As will then appear from the drawing, the brake cylinder 12 will be vented to the atmosphere past the unseated release valve 36, and chamber 85 and volume reservoir 93 will likewise be vented to the atmosphere past the unseated release valve 94.

As will also be seen from Figure 2, the high part of cam 120 will, in release position, hold release valve 122 seated and supply valve 123 unseated, so that brake pipe 46 will be connected to the feed valve device 90, by way of pipes 144 and 145. Brake pipe pressure will then be maintained according to the setting of the feed valve device 90. It is to be understood that this feed valve device is preferably one of the types commonly employed in connection with systems of this character and is provided for the purpose of maintaining a predetermined pressure of the fluid supplied from the main reservoir 92.

During running condition, the bodies of the retardation controller devices 18 and 20 will be held in their biased positions to the right, so that the parts of the other devices will be in the positions indicated in the drawing

*Service or straight air application*

When it is desired to effect a service application of the brakes, the handle 119 is moved to "service" position, which is that diagrammatically indicated in Figure 2. On moving the handle 119 to this position, contact segment 111 disengages first from contact fingers 116 and 117, and then from contact finger 115. Disengagement from contact fingers 116 and 117 deenergizes the release electromagnets in the application and release magnet valve device 14 and the adjusting magnet valve device 24. Venting of the brake cylinder 12, chamber 85, and volume reservoir 93 is therefore terminated.

Disengagement from contact finger 115 interrupts the circuit to the electromagnet in the interlock magnet valve device 28 formed by conductor 140, but at the same instant segments 112 engage and connect together contact fingers 115 and 118, which forms another circuit to this electromagnet, beginning at contact finger 118, by way of conductor 147, contacts 81 and 77 of retardation controller device 18, conductor 148, jumper 149 at the end of the train, conductor 150, contacts 80 and 76 of retardation controller device 18, conductor 151, and contact finger 113, which is now connected to segment 111 and the terminal of battery 138, by way of contact finger 114. The electromagnet of the interlock valve device is therefore maintained energized in service position of the handle 119, through a circuit which extends throughout the length of the train.

When segment 111 engages contact finger 113, the application valve electromagnet in the application and release magnet valve device 14, and the application electromagnet in the adjusting magnet valve device 24, are both energized. Both valves 32 and 88 will then be unseated. Fluid under pressure will then flow from the supply reservoir 10, through pipe 34, past unseated valve 32, pipe 35, slide valve cavity 47, pipe 48, and past the unseated ball valve 52, to brake cylinder 12.

As the pressure in the brake cylinder rises, a value will be reached at which piston 54 will be actuated downwardly far enough to seat ball valve 52. At the same time, the pressure of the fluid will unseat the cut-off valve 56 and the flow will be by way of the other parallel communication to the brake cylinder.

The purpose of the ball valve 52 and its piston 54 is to insure a brake cylinder pressure high enough to stop the train, in case the other communication by way of valve 56 should be accidentally closed for any reason.

At the same time fluid is supplied to the brake cylinder, fluid is also supplied from the feed valve device 90 past the unseated supply valve 88, to both chamber 85 and the volume reservoir 93, to a degree corresponding to that supplied to the brake cylinder.

Fluid under pressure will flow to both the brake cylinder and the retardation controller piston chamber 85 so long as the handle 119 is held in service position. The operator will therefore hold handle 119 in service position long enough to insure the desired brake cylinder pressure and the corresponding pressure in piston chamber 85. Thereafter, he moves the handle 119 to "lap" position, which is that indicated in Figure 2.

In "lap" position of the handle 119, contact finger 113 disengages from segment 111, so that supply valves 32 and 88 are again seated. Both the supply to the brake cylinder and to retardation controller piston chamber 85 will be lapped. The interlock magnet valve device will now be energized through contact finger 115.

Now if the coefficient of friction between the rubbing parts of the brakes did not vary with speed, a given brake cylinder pressure would bring the train to a stop at a substantially constant rate of retardation. However, as before stated, the coefficient of friction between the rubbing parts of the brakes increases as the speed of the train decreases, so that although the brake cylinder pressure is held constant, the rate of retardation increases as the speed of the train decreases.

The retardation controller device 18 is so designed that when the rate of retardation thus increases with the supply to the brake cylinder lapped, the body 70 will move to the left far enough to disengage contact 76 from contacts 80 and to engage contact 79 with contacts 83. Disengagement of contact 76 from contacts 80 opens the circuit between contact finger 113 and the application electromagnet of the application and release magnet valve device 14, and engagement of contact 79 with contact 83 energizes the release electromagnet in this magnet valve device, by reconnecting conductor 142 to the battery 138 by way of conductors 136 and 152. Release valve 36 is then unseated and fluid under pressure is released from the brake cylinder 12.

During this operation the pressure initially established in chamber 85 is maintained, so that the release of pressure from the brake cylinder continues until the rate of retardation will have been reduced to the point where body 70 moves far enough to the right to disengage contact 79 from contact 83.

It will therefore be obvious that after handle 119 has been moved to lap position the retardation controller device 18 will function to periodically release fluid under pressure from the brake cylinder 12, so as to maintain a rate of retardation which corresponds to the pressure in piston chamber 85, and consequently according to that selected by the operator.

As the train nears a stop, the operator may reduce the rate to be maintained by reducing the pressure in the piston chamber 85. This is accomplished by moving the handle 119 to release position, so as to energize the release electromagnet in the magnet valve device 24, thus unseating the release valve 94. When the pressure in chamber 85 has been reduced the desired amount, handle 119 is again moved back to "lap" position.

At the end of the stop, a complete release of the brakes may be effected by moving the handle 119 to and holding it in "release" position.

*Emergency or automatic application*

When it is desired to effect an emergency application of the brakes, the handle 119 is moved to "emergency" position, which is as indicated in Figure 2. In this position segments 111 and 112 are disengaged from all of the contact fingers, and the cam 120 permits spring 124 to unseat release valve 122 and seat supply valve 123.

Since disengagement of segments 111 and 112 from contact fingers 115 and 118 deenergizes the electromagnet in the interlock magnet valve device 28, it will be apparent that the brake pipe will be vented to the atmosphere both past the unseated release valve 122 and by operation of the application valve device 30.

Release of fluid under pressure from the brake pipe will take place at an emergency rate, so that piston 44 in the emergency valve device 16 will move to the extreme right hand position. In this position, slide valve 42 blanks the passage connecting with the pipe 35, and port 49 registers with the passage connecting with the pipe 48. Fluid under pressure then flows from slide valve chamber 40, and supply reservoir 10, to the brake cylinder, by way of cut-off and release magnet valve device 22, as heretofore described for a service application.

Brake pipe pressure will be reduced to atmospheric pressure during this application and the piston 44 will therefore be held in emergency position, permitting fluid under pressure to flow from the supply reservoir 10 to the brake cylinder 12 until the pressures equalize. However, as the brake cylinder pressure builds up and the train begins to decelerate, a point will be reached where body 98 of retardation controller device 20 will have moved far enough to the left to cause engagement of contact 104 with contacts 106. When this takes place, the cut-off electromagnet in the valve device 22 will be energized, and supply valve 60 will be unseated and release valve 62 seated. Fluid under pressure will then flow from pipe 48 to the valve chamber of valve 56. Valve 56 will then be held in seated position to cut off further supply to the brake cylinder.

If the rate of retardation should thereafter increase to the point where contact 105 engages contact 107, the release electromagnet will be energized and double beat valve 67 will be actuated to lower seated position. Valve chamber of valve 64 will then be vented to the atmosphere, and valve 64 will unseat to release fluid under pressure from the brake cylinder to the atmosphere, by way of safety valve device 66.

It will therefore be apparent that the retardation controller device 20 will thereafter function to intermittently release fluid under pressure from the brake cylinder 12 to maintain a rate of retardation for which the retardation controller device has been designed.

It is to be here understood that the rate of retardation permitted by the retardation controller device 20 is greater than the highest rate which can be maintained by the retardation controller device 18, this maximum rate being the maximum permitted by the adhesion between wheels and rails.

While the retardation controller device 20 may function to reduce brake cylinder pressure, it cannot reduce brake cylinder pressure below the setting of the safety valve device 66, so in the event that release valve 64 should become stuck in unseated position, sufficient pressure will be maintained in the brake cylinder to stop the train.

A release of the brakes may be effected following an emergency application by moving handle 119 to "release" position. In this position interlock magnet valve device 28 will again be energized, and release valve 122 will be seated and supply valve 123 unseated, to again connect the brake pipe 46 to the feed valve device 90. As the pressure in the brake pipe builds up, piston 44 will be actuated to the left to release position. In release position, the supply reservoir 10 is recharged from the brake pipe, by way of feed groove 154.

*Operation of interlock feature*

When the handle 119 is moved to "service" position, the circuit to the interlock magnet valve device 28 through contact finger 115 is broken and a new circuit is established through contact finger 118, which circuit includes conductors 148 and 150 extending throughout the train, as before described. If one or both of conductors 148 and 150 should be broken, so that engagement of contact finger 113 with segment 111 could not cause an application of the brakes, then the interlock magnet valve device 28 will be deenergized, and an emergency application of the brakes will follow as just previously described. Therefore, whenever the straight air portion of the equipment fails to respond to a movement of handle 119 to "service" position, the automatic portion will immediately respond to effect an emergency application of the brakes.

In a similar manner, if there should any time be a loss of current supply to the interlock magnet valve device 28, as would happen should there be a failure of the source of current supply, or accidental open circuit to the source, an emergency application of the brakes will result.

If when effecting a service application of the brakes, the operator should move handle 119 to "service" position and leave it there, then when the body 70 of the retardation controller device 18 moves to the left to open contacts 80, the circuit to the interlock magnet valve device 28 would be broken and an emergency application of the brakes would be effected at a time when least desired. To prevent this happening, contacts 82 are so arranged that they are engaged by contacts 78 before or at the same time contacts 80 and 81 are opened. In this manner the interlock magnet valve device 28 is reconnected to the battery 138, through a circuit which, beginning at the electromagnet, includes conductor 140, contact finger 115, contact segments 112, contact finger 118, conductor 147, retardation controller contacts 78 and 82, conductors 155 and 151, contact finger 113, segment 111, contact 114, and conductor 139 to the battery 138.

It will be noted that the contacts 80 and 81 are both necessary, because while opening of contacts 80 alone would deenergize the supply valve electromagnet in the magnet valve device 14, closing of contacts 82 would connect conductor 148 to the battery, and thus reenergize the supply electromagnet were not contacts 81 provided and opened at the same time contacts 80 were opened.

Another feature of importance in the invention is that after a service application of the brakes has been effected and the retardation controller device 18 has operated to lap the supply to the brake cylinder, if it is then desired to effect an emergency application, the handle 119 is moved to "emergency" position. The slide valve 42 of the emergency valve device 16 will then be operated to blank off pipe 35, so that the retardation controller device 18 can neither effect a resupply to the brake cylinder or a release of fluid under pressure therefrom, while the emergency valve device will resupply fluid under pressure to the brake cylinder, and the retardation controller device 20 will function to permit a higher rate of retardation to be maintained.

While I have illustrated my invention in connection with one embodiment, it is to be understood that I do not intend to be limited to this embodiment, or otherwise than by the scope and spirit of the appended claims.

Having now described my invention, what I claim as new and desire to secure by Letters Patent, is:

1. In a vehicle brake system, in combination, a brake cylinder, means for effecting a supply of fluid under pressure to the brake cylinder, a retardation controller device having normally open contacts and an inertia operated body operated according to the rate of retardation of the vehicle for closing said contacts, means responsive to closing of said contacts for releasing fluid under pressure from the brake cylinder, and means for varying at what rate of retardation said contacts are closed according to the pressure of fluid supplied to the brake cylinder.

2. In a vehicle brake system, in combination, a brake cylinder, a magnet valve device operable when energized to effect a supply of fluid under pressure to the brake cylinder and operable when deenergized to cut off said supply, a circuit for supplying current to energize said magnet valve device, normally closed contacts in said circuit and operable when opened to deenergize said magnet valve device, an inertia operated device operable at a chosen rate of retardation for opening said contacts, and fluid pressure operated means for establishing said chosen rate of retardation according to the degree of fluid under pressure supplied thereto.

3. In a vehicle brake system, in combination, a brake cylinder, a magnet valve device operable when energized to effect a supply of fluid under pressure to the brake cylinder and operable when deenergized to cut off said supply, a circuit for supplying current to energize said magnet valve device, normally closed contacts in said circuit and operable when opened to deenergize said magnet valve device, an inertia operated device operable at a chosen rate of retardation for opening said contacts, fluid pressure means for varying the rate of retardation at which said inertia operated device opens said contacts, and means for supplying fluid under pressure to said fluid pressure means according to a desired rate of retardation.

4. In a vehicle brake system, in combination, a brake cylinder, means for effecting a supply of fluid under pressure to the brake cylinder, a magnet valve device operable to cut off said supply, a second magnet valve device operable to release fluid under pressure from the brake cylinder, a retardation controller device having normally closed contacts and normally open contacts and operable at one rate of retardation to open said normally closed contacts and operable at another rate of retardation to close said normally open contacts, means responsive to opening of said normally closed contacts for operating said first magnet valve device, means responsive to closing of said normally open contacts for operating said second magnet valve device, and means operable in effecting an application of the brakes for varying at what rate of retardation said contacts are opened and closed.

5. In a vehicle brake system, in combination, a brake cylinder, means for effecting a supply of fluid under pressure to the brake cylinder, a retardation controller device having contacts operated by a body moved according to the rate of retardation of the vehicle, means responsive to operation of said contacts for effecting a release of fluid under pressure from the brake cylinder, fluid pressure means for opposing movement of said body, and means for effecting a supply of fluid under pressure to said fluid pressure means according to a desired rate of retardation.

6. In a vehicle brake system, in combination, a brake cylinder, an application magnet valve device and a release magnet valve device for controlling the supply of fluid under pressure to and its release from the brake cylinder, a first circuit for said application valve device and a second circuit for said release valve device, means for supplying current to said first circuit to cause fluid under pressure to be supplied to the brake cylinder, normally closed contacts in said first circuit operable when opened to open said circuit, normally open contacts in said second circuit operable when closed to supply current to said release valve device to release fluid under pressure from the brake cylinder, an inertia operated device operable at a chosen rate of retardation to open said closed contacts and to close said open contacts, and means operable upon effecting an application of the brakes for establishing said chosen rate in accordance with the degree of fluid under pressure supplied to the brake cylinder.

7. In a vehicle brake system, in combination, a brake cylinder, an application magnet valve device and a release magnet valve device for controlling the supply of fluid under pressure to and its release from the brake cylinder, a first circuit for said application valve device and a second circuit for said release valve device, means for supplying current to said first circuit to cause fluid under pressure to be supplied to the brake cylinder, normally closed contacts in said first circuit operable when opened to open said circuit, normally open contacts in said second circuit operable when closed to supply current to said release valve device to release fluid under pressure from the brake cylinder, an inertia operated device operable at a chosen rate of retardation to open said closed contacts and to close said open contacts, and means for varying the chosen rate at which said contacts are opened and closed according to the supply of fluid under pressure to the brake cylinder.

8. In a vehicle brake system, in combination, a brake cylinder, a brake control device having a handle movable from a release to an application position, a retardation controller device having contacts operable at a chosen rate of retardation, fluid pressure means for varying at what rate said contacts are operated, means responsive to movement of said handle to application position for supplying fluid under pressure to said fluid pressure means, and means also responsive to movement of said handle to application position for supplying fluid under pressure to the brake cylinder and responsive to operation of said contacts for cutting off said supply.

9. In a vehicle brake system, in combination, a brake cylinder, a brake control device having a handle movable from a release to an application position, a retardation controller device having normally closed and normally open contacts and an inertia operated body operated at a chosen rate of retardation for opening said closed contacts and for closing said open contacts, fluid pressure means for varying at what rate said contacts are opened and closed, means responsive to movement of said handle to application position for supplying fluid under pressure to said fluid pressure means, and means also responsive to movement of said handle to application position for supplying fluid under pressure to the brake cylinder and operable when said normally closed contacts are opened to cut off said supply and when said normally open contacts are closed to release fluid under pressure from the brake cylinder.

10. In a vehicle brake system, in combination, a brake cylinder, a normally energized release magnet valve device operable when energized to vent the brake cylinder to the atmosphere and when deenergized to cut off said venting, a normally deenergized application magnet valve device operable when energized to supply fluid under pressure to the brake cylinder and operable when deenergized to cut off said supply, brake control means operable to application position to deenergize said release magnet valve device and to energize said application magnet valve device, a retardation controller device operated according to the rate of retardation of the vehicle, and means separate from said brake control means and responsive to operation of said retardation controller device at a chosen rate of retardation for deenergizing said application magnet valve device and for energizing said release magnet valve device.

11. In a vehicle brake system, in combination, a brake cylinder, a normally energized release magnet valve device operable when energized to vent the brake cylinder to the atmosphere and when deenergized to cut off said venting, a normally deenergized application magnet valve device operable when energized to supply fluid under pressure to the brake cylinder and operable when deenergized to cut off said supply, brake control means operable to application position to deenergize said release magnet valve device and to energize said application magnet valve device, a retardation controller device operated according to the rate of retardation of the vehicle, means responsive to operation of said retardation controller device at a chosen rate of retardation for deenergizing said application magnet valve device and for energizing said release magnet valve device, and means for varying the chosen rate at which the retardation controller device operates said valve devices according to operation of said brake control means.

12. In a vehicle brake system, in combination, a brake cylinder, means for establishing a communcation having parallel branch paths through which fluid under pressure is supplied to the brake cylinder, means for effecting a supply of fluid under pressure through said communication, a valve device in one of said branch paths operated upon a predetermined pressure for closing said branch path, normally deenergized electroresponsive valve means operable when energized to close the other of said branch paths, normally deenergized release valve means operable when energized to effect a release of fluid under pressure from the brake cylinder, and a retardation controller device for controlling energization and deenergization of said electroresponsive and release valve means.

13. In a vehicle brake system, in combination, a brake cylinder, a brake control device having a service and an emergency application position, means responsive to operation of said device to service application position for effecting a supply of fluid under pressure to the brake cylinder by straight air operation, means responsive to operation of said device to emergency application position for effecting a supply of fluid under pressure to the brake cylinder by automatic operation, and means rendered operable automatically upon failure of said application by straight air operation while said brake control device is still in service application position for effecting said operation by automatic operation.

14. In a vehicle brake system, in combination, a brake cylinder, electroresponsive valve means for effecting a supply of fluid under pressure to the brake cylinder by straight air operation, a circuit for supplying current to operate said electroresponsive valve means, means for connecting said circuit to a source of current supply to effect a straight air application of the brakes, and means automatically operated upon a failure of current in said circuit when connected to said source for effecting a supply of fluid under pressure to the brake cylinder by automatic operation.

15. In a vehicle brake system, in combination, a brake cylinder, an electroresponsive valve device operable when energized to effect a supply of fluid under pressure to the brake cylinder, a circuit for supplying current to said electroresponsive valve device, control means for connecting said circuit to a source of current supply when effecting an application of the brakes, a brake pipe, means responsive to a reduction in brake pipe pressure for also effecting a supply of fluid under pressure to the brake cylinder, and means automatically operable upon a failure of current to materialize in said circuit when connected to said source and independently of further operation of said control means to effect a reduction in brake pipe pressure.

16. In a vehicle brake system, in combination, a brake cylinder, a brake control device having a release position, a service application position and an emergency application position, means responsive to operation of said control device to service application position for supplying fluid under pressure to the brake cylinder by straight air operation, means potentially operative in either of said application positions to effect a supply of fluid under pressure to the brake cylinder by automatic operation, and means for preventing said supply by automatic operation when said control device is in service application position but becoming automatically operable to effect said supply by automatic operation upon a failure of the supply by straight air operation independently of movement of said control device to emergency position.

17. In a vehicle brake system, in combination, a brake cylinder, a magnet valve device operable when energized to supply fluid under pressure to the brake cylinder, a brake pipe, an automatic valve device operated upon a reduction in brake pipe pressure for also supplying fluid under pressure to the brake cylinder, electroresponsive valve means for effecting a reduction in brake pipe pressure, a first circuit for energizing said magnet valve device, a second circuit for energizing said electroresponsive valve means, a third circuit for also energizing said electroresponsive valve means, and a brake control device having a release and an application position and operable in release position to supply current to said second circuit only and operable in said application position to supply current to said first and third circuits only, said electroresponsive valve means being operable upon a failure of current in said first circuit to effect a reduction in brake pipe pressure.

18. In a train brake system, in combination, a brake cylinder, a brake pipe, an automatic valve device operated upon a reduction in brake pipe pressure for supplying fluid under pressure to the brake cylinder, electroresponsive valve means for effecting a reduction in brake pipe pressure, a control circuit extending throughout the train, means responsive to current in said control circuit for supplying fluid under pressure to the brake cylinder, a second circuit connected to said control circuit and operable to supply current to energize said electroresponsive valve means when current is supplied to said control circuit, a retardation controller device operable at a chosen rate of retardation to deenergize said control circuit, and contacts operated by said retardation controller device for reconnecting said electroresponsive valve means to a source of current supply at or before deenergization of said control circuit.

19. In a vehicle brake system, in combination, a brake cylinder, means for establishing a communication through which fluid under pressure is supplied to the brake cylinder, magnet valve means for controlling the supply of fluid under pressure to and its release from said communication, a retardation controller device for controlling said magnet valve means, an automatic valve device operated upon a decrease in pressure for isolating said magnet valve means and for supplying fluid under pressure to the brake cylinder, a second retardation controller device operable at a higher rate of retardation than said first retardation controller device, and means responsive to operation of said second retardation controller device for cutting off the supply to the brake cylinder effected by said automatic valve device and for releasing fluid under pressure from the brake cylinder.

20. In a vehicle brake system, in combination, a brake cylinder, means for effecting a supply of fluid under pressure to the brake cylinder, a retardation controller device operated according to the rate of retardation of the vehicle, magnet valve means responsive to operation of said retardation controller device at a chosen rate of retardation for cutting off said supply to the brake cylinder, a brake pipe, an automatic valve device operated upon a reduction in brake pipe pressure for resupplying fluid under pressure to the brake cylinder, a second retardation controller device operated also according to the rate of retardation of the vehicle, and means responsive to operation of said second retardation controller device at a higher rate of retardation than said first retardation controller device for subsequently cutting off said resupply to said brake cylinder.

21. In a vehicle brake system, in combination, a brake cylinder, means for effecting a supply of fluid under pressure to the brake cylinder, a retardation controller device having normally closed contacts adapted to be opened at a chosen rate of retardation, means responsive to opening of said normally closed contacts for cutting off the supply to the brake cylinder, a brake pipe, an automatic valve device operated upon a reduction in brake pipe pressure for resupplying fluid under pressure to the brake cylinder, a second retardation controller device having normally open contacts adapted to be closed at a rate of retardation higher than said chosen rate, and means responsive to closing of said normally open contacts for cutting off said resupply.

22. In a vehicle brake system, in combination, a brake cylinder, means for effecting a supply of fluid under pressure to the brake cylinder, a retardation controller device having normally closed contacts adapted to be opened at one rate of retardation and normally open contacts adapted to be closed at the same time or slightly after said normally closed contacts are opened, means responsive to opening of said normally closed contacts for cutting off the supply to the brake cylinder and responsive to closing of said normally open contacts for releasing fluid under pressure from the brake cylinder, a brake pipe, an automatic valve device operable upon a reduction in brake pipe pressure to prevent release of fluid under pressure from the brake cylinder by said last means and operable to resupply fluid under pressure to the brake cylinder, a second retardation controller device having two sets of normally open contacts, said contacts being closable at a rate of retardation higher than said rate for said first retardation controller device, and means responsive to closing of said contacts for cutting off said resupply and for releasing fluid under pressure from the brake cylinder.

23. In a vehicle brake system, in combination, a brake cylinder, a brake pipe, an automatic valve device operated upon a reduction in brake pipe pressure for supplying fluid under pressure to the brake cylinder, brake valve means for effecting reductions in brake pipe pressure, a retardation controller device having one set of normally open contacts closable at one rate of retardation and another set of normally open contacts closable at another rate of retardation, means responsive to closing of said first set of contacts for cutting off the supply to the brake cylinder, and means responsive to closing of the other set of contacts for releasing fluid under pressure from the brake cylinder.

24. In a vehicle brake system, in combination, a brake cylinder, a brake pipe, an automatic valve device operated upon a reduction in brake pipe pressure for supplying fluid under pressure to the brake cylinder, brake valve means for effecting reductions in brake pipe pressure, a retardation controller device having one set of normally open contacts closable at one rate of retardation and another set of normally open contacts closable at another rate of retardation, means responsive to closing of said first set of contacts for cutting off the supply to the brake cylinder, means responsive to closing of the other set of contacts for releasing fluid under pressure from the brake cylinder, and means for preventing a release of fluid under pressure from the brake cylinder by said last means below a predetermined value.

25. In a fluid pressure brake system, in combination, a brake cylinder, a brake pipe, an automatic valve device operated upon a reduction in brake pipe pressure for supplying fluid under pressure to the brake cylinder, means for establishing a communication having parallel branch paths through which fluid under pressure flows to the brake cylinder, a valve device operated upon a predetermined brake cylinder pressure for closing one of said branch paths, a magnet valve device operable when energized to close the other of said branch paths, a second magnet valve device operable when energized to release fluid under pressure from the brake cylinder, a retardation controller device operable at one rate of retardation to energize said first magnet valve device and operable at a second rate of retardation to energize said second magnet valve device, and means for preventing release of fluid under pressure from the brake cylinder by said second magnet valve device below a predetermined value.

26. In a vehicle brake system, in combination, brake means, a normally energized release controlling electroresponsive means operable when energized to effect a release of said brake means and when deenergized to terminate said release, a normally deenergized application controlling electroresponsive means operable when energized to effect an application of said brake means and operable when deenergized to terminate said application, control means operable to an application position to deenergize said release electroresponsive means and to energize said application electroresponsive means, a retardation controller device operated according to the rate of retardation of the vehicle, and means responsive to operation of said retardation controller device at a chosen rate of retardation for effecting deenergization of said application electroresponsive means and for energizing said release electroresponsive means.

27. In a vehicle brake system, in combination, a brake cylinder, a normally energized release magnet valve device operable when energized to effect a release of fluid under pressure from said brake cylinder and when deenergized to cut off said release, a normally deenergized application magnet valve device operable when energized to effect a supply of fluid under pressure to said brake cylinder and operable when deenergized to effect a cut-off of said supply, control means operable to deenergize said release magnet valve device and to energize said application magnet valve device, a retardation controller device operated according to the rate of retardation of the vehicle, means responsive to operation of said retardation controller device at a chosen rate of retardation for deenergizing said application magnet valve device and for energizing said release magnet valve device, and means for varying the chosen rate at which the retardation controller device operates said valve devices according to operation of said control means.

28. In a vehicle brake system, in combination, fluid pressure brake means, means for establishing a communication through which fluid under pressure is supplied to effect an application of said brake means, magnet valve means for controlling the supply of fluid under pressure through said communication, an automatic valve device operated upon a decrease in pressure for isolating said magnet valve means and for supplying fluid under pressure to said communication, means operated according to the rate of retardation of the vehicle, and means responsive to operation of said retardation controlling means at one rate of retardation for effecting operation of said magnet valve means and responsive to operation at a different rate of retardation for effecting cutting off of the supply by said automatic valve device and for releasing fluid under pressure from said communication.

29. In a fluid pressure brake system, in combination, fluid pressure brake means, a brake pipe, an automatic valve device operated upon a reduction in brake pipe pressure for effecting a supply of fluid under pressure to effect an application of said brake means, means for establishing a communication having parallel branch paths through which said supply flows, a valve device operated upon a predetermined pressure for closing one of said branch paths, a first magnet valve device operable when energized to close the other of said branch paths, a second magnet valve device operable when energized to effect a release of fluid under pressure from said communication, a retardation controller device operable at one rate of retardation to energize said first magnet valve device and operable at a second rate of retardation to energize said second magnet valve device, and means for preventing release of fluid under pressure from said communication by said second magnet valve device below a predetermined value.

30. In a vehicle brake system, in combination, brake means, a pipe to which fluid under pressure is supplied to effect an application of the brakes, means for effecting a supply of fluid under pressure to said pipe, a retardation controller device for limiting the degree of application of said brake means, and means for automatically adjusting the setting of said retardation controller device to cause its adjustment to be substantially proportional to the pressure of fluid initially supplied to said pipe.

31. In a vehicle brake system, in combination, a fluid pressure brake, a manually operable brake control element operable out of a normal position in which the brake is released to initiate an application of the brake, a retardation controller operatively responsive to the rate of retardation of the vehicle for regulating the retardation produced on the vehicle by the brake to a degree dependent upon the extent of movement of said manually operable brake control element out of its release position, a pipe normally charged with fluid under pressure, means operably responsive to variations in the pressure of fluid in said pipe for effecting an application of said brake, a second retardation controller operatively responsive to the rate of retardation of the vehicle for regulating the retardation produced by the fluid pressure brake to a degree higher than the maximum degree effected by the first said retardation controller, and means for rendering said first retardation controller ineffective to regulate the degree of retardation upon operation of the said means which responds to variations in the pressure of fluid in said pipe.

GEORGE L. COTTER.